United States Patent [19]

O'Rourke et al.

[11] Patent Number: 5,572,950
[45] Date of Patent: Nov. 12, 1996

[54] CAT LITTER BOX ASSEMBLY HAVING A COVER AND A RETRACTABLE HOOD

[76] Inventors: Anthony O'Rourke, 27420 Winding Way, Malibur; Kevin Koloszvari, 21995 Kingshill, Mission Viejo, both of Calif.

[21] Appl. No.: 403,231

[22] Filed: Mar. 9, 1995

[51] Int. Cl.⁶ ................................................ A01K 1/035
[52] U.S. Cl. ........................................ 119/165; D30/161
[58] Field of Search .................................. 119/165, 168, 119/166, 167, 169, 170, 161; 220/213, 252, 908; D30/161

[56] References Cited

U.S. PATENT DOCUMENTS

| | | |
|---|---|---|
| 286,694 | 11/1986 | O'Rourke . |
| 298,371 | 11/1988 | Reynolds . |
| 298,672 | 11/1988 | Herbst . |
| 300,966 | 5/1989 | Conner . |
| 300,967 | 5/1989 | Conner . |
| 300,968 | 5/1989 | Conner . |
| 308,589 | 6/1990 | Shay . |
| 310,587 | 9/1990 | Hinson . |
| 399,753 | 3/1889 | Jones et al. ............... 220/252 |
| 2,661,114 | 12/1953 | Barnett et al. ............. 220/252 |
| 2,736,452 | 2/1956 | Roop ...................... 220/252 |
| 3,827,401 | 8/1974 | Franzl .................... 119/169 |
| 4,732,111 | 3/1988 | Runion . |
| 4,771,731 | 9/1988 | Derx et al. . |
| 4,792,082 | 12/1988 | Williamson . |
| 4,846,104 | 7/1989 | Pierson, Jr. . |
| 4,884,527 | 12/1989 | Skirvin . |
| 4,986,217 | 1/1991 | Robinson et al. . |
| 5,044,325 | 9/1991 | Miksitz . |
| 5,134,973 | 8/1992 | Sarullo .................... 119/165 |
| 5,134,974 | 8/1992 | Houser . |
| 5,178,099 | 1/1993 | Lapps et al. . |
| 5,184,575 | 2/1993 | Reinartz . |
| 5,249,549 | 10/1993 | Rockaitis . |

FOREIGN PATENT DOCUMENTS 2056832  6/1993  Canada .................... 119/165

*Primary Examiner*—Todd E. Manahan

[57] ABSTRACT

A cat litter box assembly comprises a rectangular litter box tray, an upstanding cover removably securable on the walls of the tray so as to extend over and about a portion of the tray rearwardly of the front wall thereof, and a removable hood pivotally mountable on the cover between an extended position and a retracted position. The hood defines an elongated forward edge portion which, when the hood is in the extended position is disposed forwardly of and above the front wall of the tray and cooperates therewith to define an elongated cat entry area therebetween extending substantially the length of the front wall of the litter tray. The front and rear litter tray walls are longer than the side walls, maximizing the width of the cat entry area for the size of the tray. In the retracted position the hood is disposed interiorally of the cover and in substantial juxtaposition therewith so as to provide unobstructed access to the interior of the litter box tray for viewing and litter cleaning. A filter element is mounted in the upper end of the cover. The cover and the hood are provided with mating sealing members which are in sealing engagement when the hood is in its extended position, preventing odors from escaping therebetween. Air deflectors are defined by the hood adjacent the ends of the cat entry area to prevent cross drafts from drawing odors outwardly therethrough and rendering the assembly virtually odor free.

39 Claims, 13 Drawing Sheets

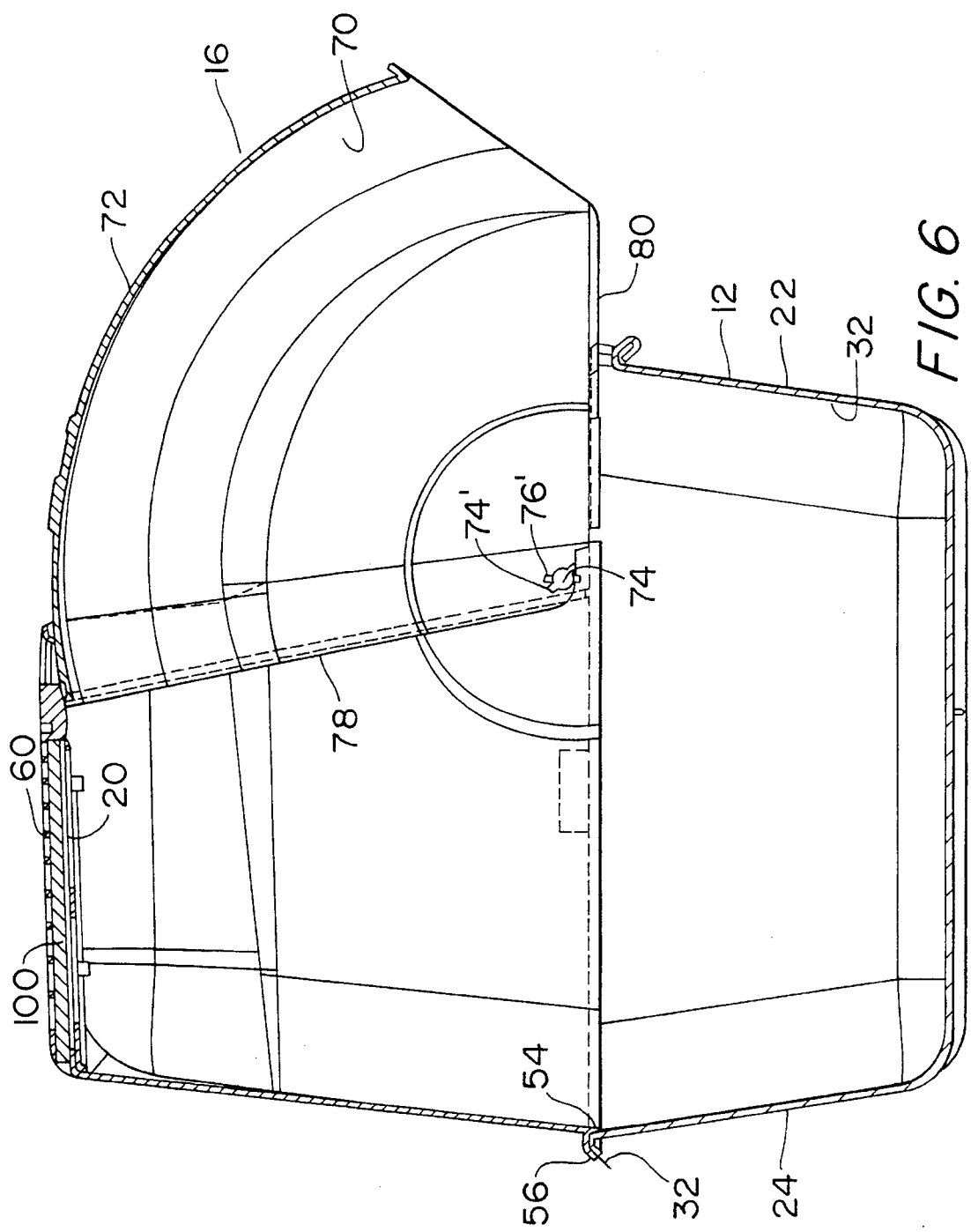

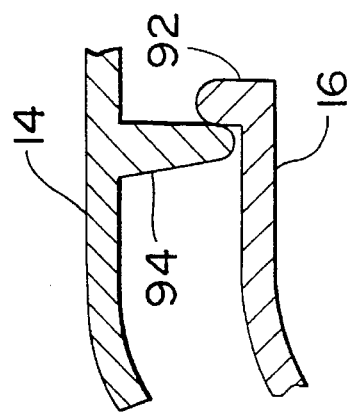
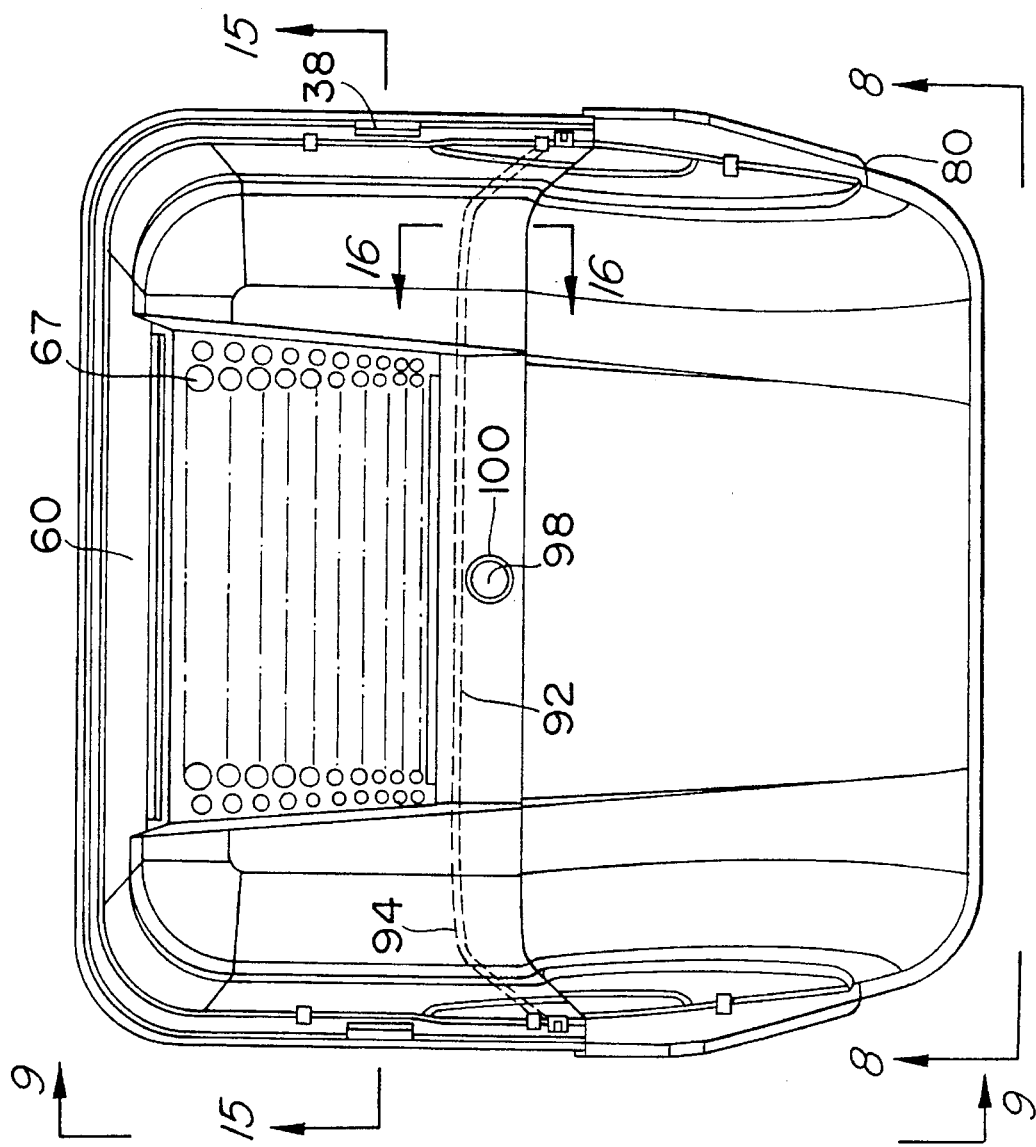

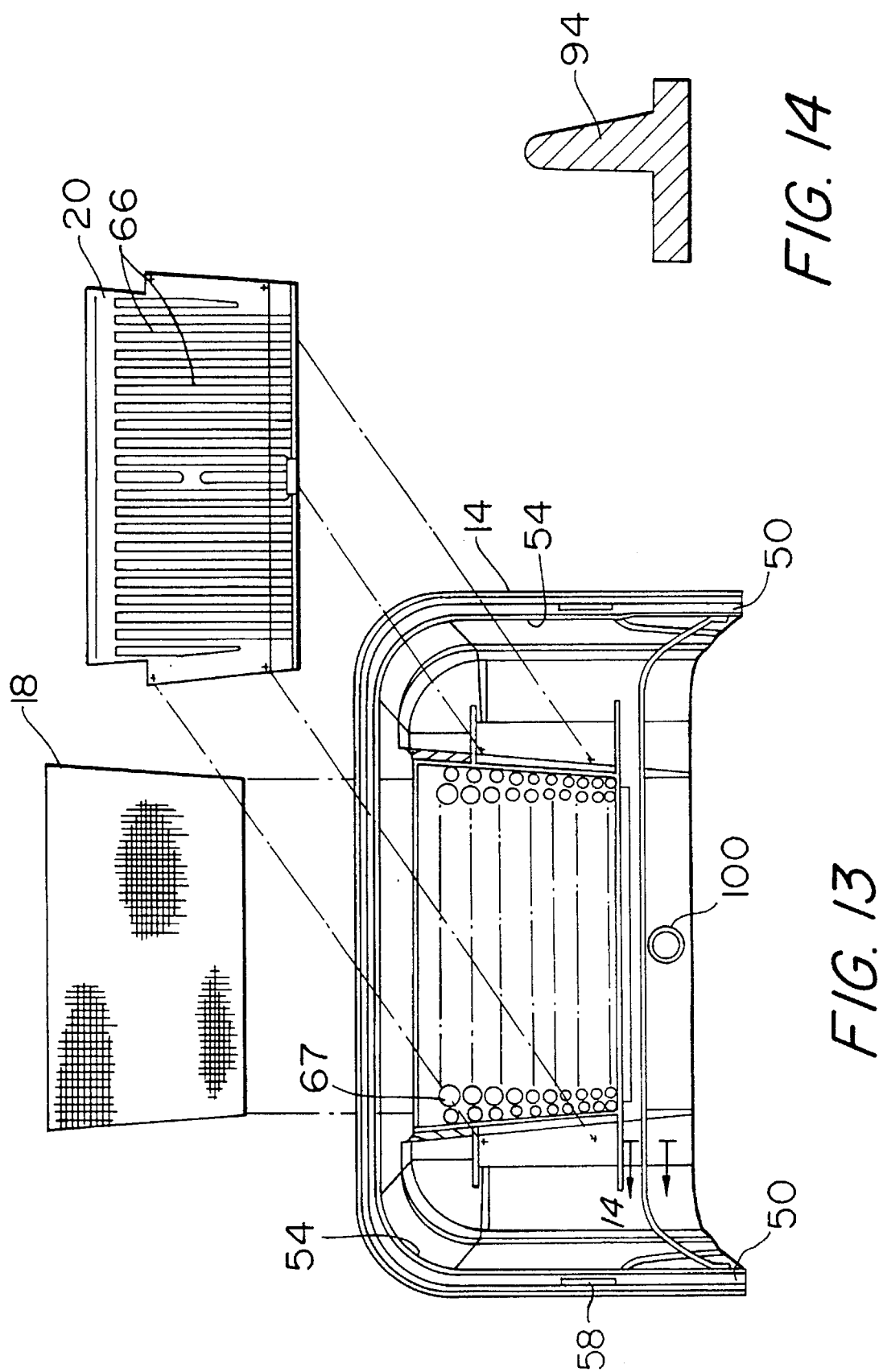

5,572,950

CAT LITTER BOX ASSEMBLY HAVING A COVER AND A RETRACTABLE HOOD

BACKGROUND OF THE INVENTION

The present invention relates to cat litter boxes, and more particularly to a covered cat litter box assembly having a retractable hood which provides easy and unobstructed viewing and access for cleaning, more interior room for the cat, a larger entry area for the cat, minimal space requirements for the owner and improved odor control. The use of covered cat litter boxes has become increasingly popular as the cover helps reduce odors, conceals the animal waste and soiled litter from view, and when provided with a single entry location, limits litter tracking to one side of the box. Cat litter box covers generally comprise elevated sidewalls so that the cat can use the litter box without the pet owner having to remove the cover. It has been found that the privacy afforded by such litter box covers is preferred by many cats provided the cover is not overly confining. However, for a cat litter box cover to be acceptable to most cats and indeed healthful, it must be relatively large and have sufficient headroom so that the cat can stand and move about freely within the covered box to cover and inspect its eliminations. It should also provide easy entry into the box which is particularly important for older cats which are less agile and growing in numbers. As such litter box covers are relatively bulky, they should be removable so that they do not create storage problems when not in use nor transportation difficulties.

The size of a litter box cover necessary to provide the spaciousness required for healthful, hygienic litter, and which cats instinctively desire, often presents problems for their owners. When the waste and soiled litter are removed from a covered litter box and when the cat litter is changed, the pet owner must typically remove and replace a bulky cover which may have up to four locking latches to release. Even when checking the condition of the litter, the owner must either remove the cover or kneel down and peer through a window or access opening in the cover. As a result, many pet owners have found conventional litter box covers too difficult or inconvenient to use and awkward to handle. This problem has become more acute with the recent increasing popularity of clumping cat litters wherein the clumps of soiled litter should be removed once or twice a day, depending on the number of cats using the box, as opposed to the litter simply being changed about once a week.

The use and handling problems associated with removable conventional litter box covers can be substantially reduced by providing a removable hinged securement of the cover to the rear of the litter box so that the pet owner can simply pivot the cover out of the way to provide the desired viewing and access to the interior of the box. A removable hinged connection between the litter box and cover, while facilitating handling of the cover, frequency does not present a viable solution to the conflict between the space requirements of the cat and those of its owner. As a hinged litter box cover is raised to the open position, the cover necessarily pivots upwardly and rearwardly from the box. Space limitations frequently exist in many locations where cat litter boxes are kept and often there is simply not room behind and/or above the litter box to accommodate the use of a hinged cover.

With the increasing population of older cats, the size of the entry area in a covered litter box as well as the usable interior space becomes even more important. Cats naturally tend to enter a covered litter box and turn around to increase their privacy and watch for intruders. Older cats are less agile and have more difficulties negotiating small entry areas and maneuvering in tight spaces. The same holds true for larger cats. If the entry area is inadequate, these cats often will not use the box. However, as one increases the size of the access opening to accommodate older and larger cats, the size of the litter box cover in which the opening is formed generally must also be increased, compounding the space problem for the pet owner.

If a covered litter box will not fit in the available space and allow one to conveniently use the cover, the pet owner will either simply select a smaller litter box if one is available, fail to clean and change the litter as needed, or forgo the advantages of a covered litter box altogether. Because space limitations are so common and the pet owner is the purchaser of the product, the covered cat litter boxes currently available generally have relatively confined interiors, inadequate headroom for "turn and cover" maneuvers and access openings that are often difficult for older cats to use. These litter boxes do not adequately address the spacial needs and instincts of the cat. At best they present a compromise between those needs and the convenience of its owner. The result of such a comprise is often the failure of the cat to use the covered litter box, resulting in family conflicts, hostility toward the cat and possibly abandonment or surrender of the pet to a shelter where over 8 million cats are destroyed annually.

If the cover on a litter box makes viewing and access to the litter difficult or awkward, cleaning and replacement of the soiled litter is generally done less frequency. The failure of the pet owner to check, clean and replace the litter on a frequent and regular basis will often cause a cat to discontinue using the box. When this occurs, the owner may loose patience with the cat and the cat may again loose its home. Unfortunately for many cats, the covered litter boxes heretofore available have not been very convenient to use.

The litter box of the present invention addresses the issues of conflicting spacial needs and handling and provides a single solution to these problems without having to comprise the needs of the cat and those of its owner. The covered litter box of the present invention is not only fast, easy and convenient to use, it provides a spacious interior and large entry area for the cat while requiring minimal space from the cat's owner home.

In addition to solving the above problems, the litter box of the present invention is also configured to maximize odor control. The reduction of cat litter box odor is identified by cat owners as the single most significant factor in purchasing a covered cat litter box. While definitely superior to uncovered litter boxes in containing odors, covered litter boxes are not odor free. They typically carry inadequate filter elements, have no means for directing air flow and odors to those filter elements, and are highly susceptible to breezes or drafts from an open window or door which will draw the odor carrying air from the litter boxes throughout the home.

In the litter box of the present invention not only is a highly effective high density activated carbon filter efficiently mounted in the upper end of the litter box cover, the retractable hood is particularly configured both to contain odors within the litter box and direct the rising fumes therein to the filter element where the odors are efficiently collected and neutralized. The movable hood is also provided with sealing ridges to prevent odors from escaping between the hood and adjacent components and with extended skirt portion adjacent the sides of the cat entry area which deflect breezes and drafts and prevents them from carrying off the odors before they can be neutralized by the filter element. As a result of these features, the litter box of the present invention is virtually odor free.

In addition to meeting the functional needs of both the cat and its owner, the cat litter box of the present invention also addresses the economical issues of damage-free construction and shipping. The components of the covered litter box are configured such that they can be readily molded of polypropylene or other suitable plastic material and nested together in a highly compact array for shipping. As a result, the cat litter box of the present invention obtains all of the beneficial results discussed above with a minimal impact on the costs of a covered litter box.

SUMMARY OF THE INVENTION

Briefly, the present invention is directed to a covered cat litter box assembly comprising a substantially rectangular open box for containing a supply of cat litter, an elevated rear cover carried by and projecting upwardly from and about a rear portion of the litter box and a retractable hood pivotally mounted on the rear cover adjacent the sides of the box and movable between a forwardly extended position and a retracted position. A simple push-button lock is provided between the hood and cover to maintain the hood in the extended position and render the assembly more resistant to litter tampering by small children and dogs. To provide unobstructed viewing and access to the litter box for cleaning, the lock is easily released and the hood is simply pushed rearwardly within the rear cover to its retracted position, fully exposing and accessing the interior of the box.

In the extended position the retractable hood projects forwardly from the upstanding side walls of the rear cover beyond the forward end of the litter box and forwardly and downwardly in an arcuate disposition from the upper surface of the rear cover, terminating in a horizontal edge disposed above and forwardly of the forward end of the litter box so as to define an enlarged wide-side entry area for the cat. The entry area extends between and along the entire length of the forward and longest end of the litter box and the elevated forwardly disposed horizontal edge of the hood. By extending the access opening along the maximum length of the litter box, even an elderly or large cat can easily pass therethrough at any desired angle to gain entry to the box. As the side walls of the rear cover and retractable hood project upwardly from the side walls of the litter box sufficiently to dispose the upper surface of the rear cover and the adjacent portions of the projecting hood substantially above the litter box when the hood is in the extended position, ample interior space and head room are provided for the cat within the litter assembly.

As hood is pivoted rearwardly, it retracts within the rear cover substantially adjacent the interior wall surfaces thereof. In the fully retracted position, the forward perimeter edges of the hood are disposed adjacent the forward perimeter edges of the rear cover and the rearward perimeter edges of the hood are adjacent the lower perimeter edges of the cover and the upper edges of the side and rear walls of the litter box. As a result, intrusion of the hood into the interior of the box in the retracted position is avoided to facilitate cleaning of the box and an unobstructed view of and access to the entire interior area of the box is readily provided. Thus handling of the hood for cleaning and litter changing purposes is fast, easy and convenient. In addition, as the hood is moved between its forward and retracted positions intrusion of the hood into the areas above and behind the cover is avoided thereby minimizing the exterior space requirements for the litter box assembly while providing ample interior space and headroom within the assembly for the cat.

The arcuate configuration of the upper surface of the retractable hood also serves to direct upwardly moving vapors within the litter box to a high-density activated charcoal filter mounted on raised ridges in a support grill in the upper surface of the rear cover where the odors are effectively trapped and neutralized. To prevent the escape of fumes between the rear cover and movable hood, mating ridges are provided adjacent the forward edges of the cover and the rearward edges of the retractable hood such that when the hood is in the extended position, the engagement of the mating ridges prevent air flow therebetween. Projecting side skirts are formed on the hood adjacent the sides of the cat access opening to deflect breezes or drafts passing thereby which would otherwise draw odor-laden air from the interior of the litter box through the access openings. As a result, a virtually odor-free cat litter box is obtained.

In addition to mating with the cover and litter box so as to move between its extended and retracted positions without occluding any portion of the litter box or litter bed and thereby providing unobstructed access to all portions of the box and litter for use by the cat and cleaning by the owner, the retractable hood also mates with the cover and litter box prior to assembly thereof in a very compact nested array to reduce shipping and breakage costs. To achieve such an array without adversely affecting the interior space within the litter box assembly, the side wall portions of the hood and the side and rear wall portions of the cover are tapered slightly inwardly from their lower ends to their upper ends such that a plurality of nested hoods can be compactly disposed within a plurality of oppositely facing nested covers which in turn are carried within a plurality of nested litter boxes to obtain a highly compact array of assembly parts.

It is the principle object of the present invention to provide an improved covered litter box assembly which is odor-free during normal use, provides a cat with ample interior space and headroom, readily provides unobstructed viewing and access to the litter for cleaning, and requires no additional space above or behind the assembly to remove the cover and obtain such unobstructed viewing and access.

It is another object of the present invention to provide a covered litter box assembly having a sufficiently large access opening to readily accommodate elderly and large cats such that the cat can easily pass therethrough and readily and healthfully maneuver within the covered box as desired.

it is a further object of the present invention to provide a covered litter box assembly which is of economical construction and is comprised of components which, prior to assembly, are readily nested in a compact array to minimize shipping costs.

It is yet another object of the present invention to provide a covered litter box assembly provides which readily unobstructed viewing and access to the litter contained therein for cleaning but which is resistant to litter tampering by curious children and dogs.

These and other objects and advantages of the present invention will become readily apparent from the following detailed description taken in conjunction with the accompanying drawings.

DESCRIPTION OF THE DRAWINGS

FIG. 6 is a sectional view taken along the line 6—6 in FIG. 2 and including a litter liner.

FIG. 7 is a top plan view of the litter box assembly of the present invention.

FIG. 13 is an exploded view of the underside of the rear cover showing the component elements of the filtering assembly.

FIG. 14 is a sectional view taken along the line 14—14 in FIG. 13.

FIG. 16 is a sectional view taken along the line 16—16 in FIG. 7.

DESCRIPTION OF THE PREFERRED EMBODIMENT

Figure 1:
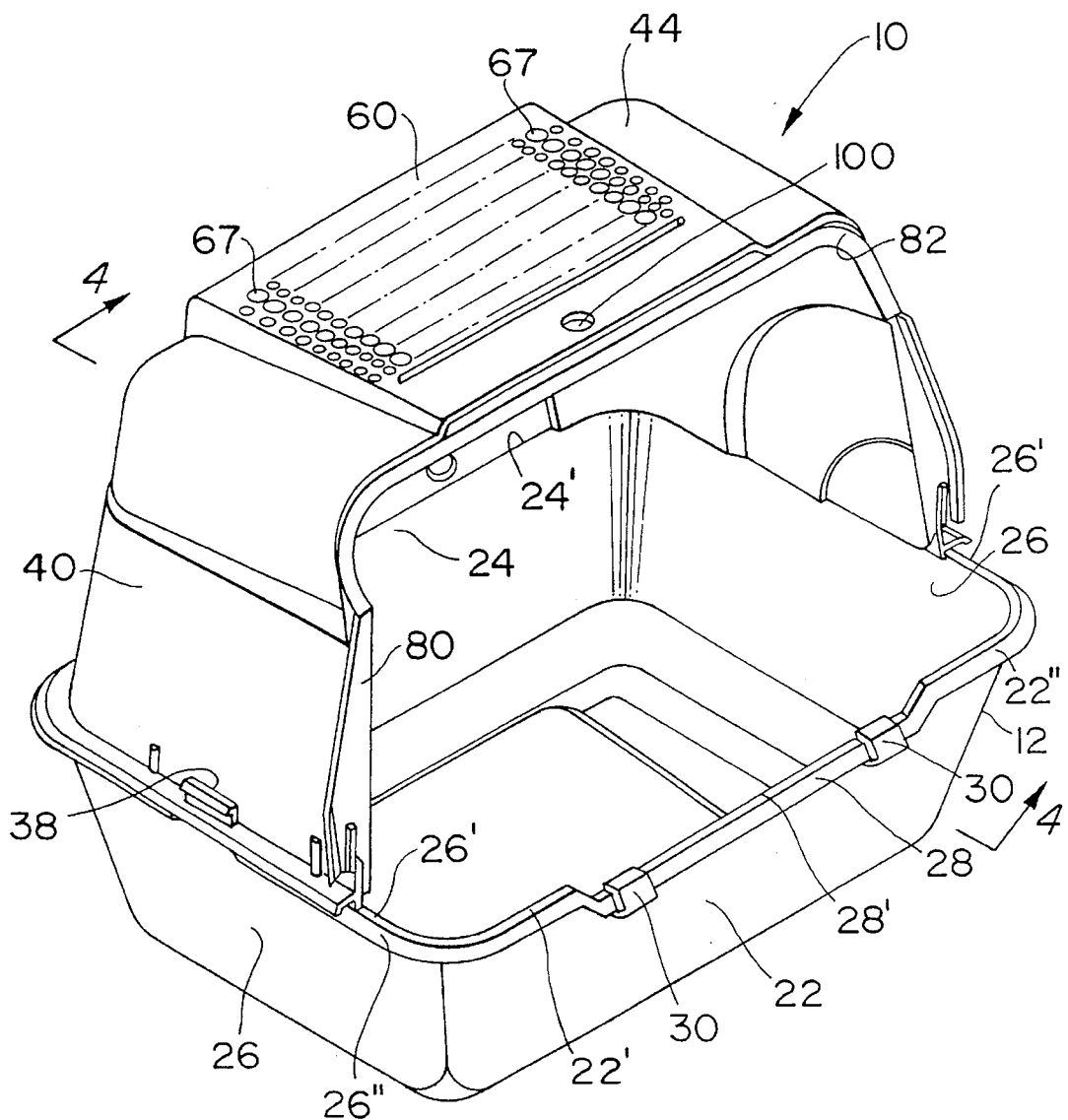
FIG. 1 is a perspective view of the cat litter box assembly of the present invention showing the hood in the retracted position.

Referring now in detail to the drawings, the covered litter box assembly 10 is comprised of a generally rectangular open litter tray 12 for containing a supply of cat litter (not shown), an upstanding rear cover 14, a retractable hood 16 and a filter element 18 carried by a supporting grate 20 disposed in the upper surface of cover 14. The litter tray 12, cover 14 and retractable hood 16 are all preferably molded of a polypropylene or other suitable plastic material. While the litter box assembly 10 is particularly designed for use with a clumping cat litter which typically requires more frequent access for removal of the soiled litter than conventional cat litter, any type of cat litter can be employed with the litter box assembly of the present invention.

Figure 8:
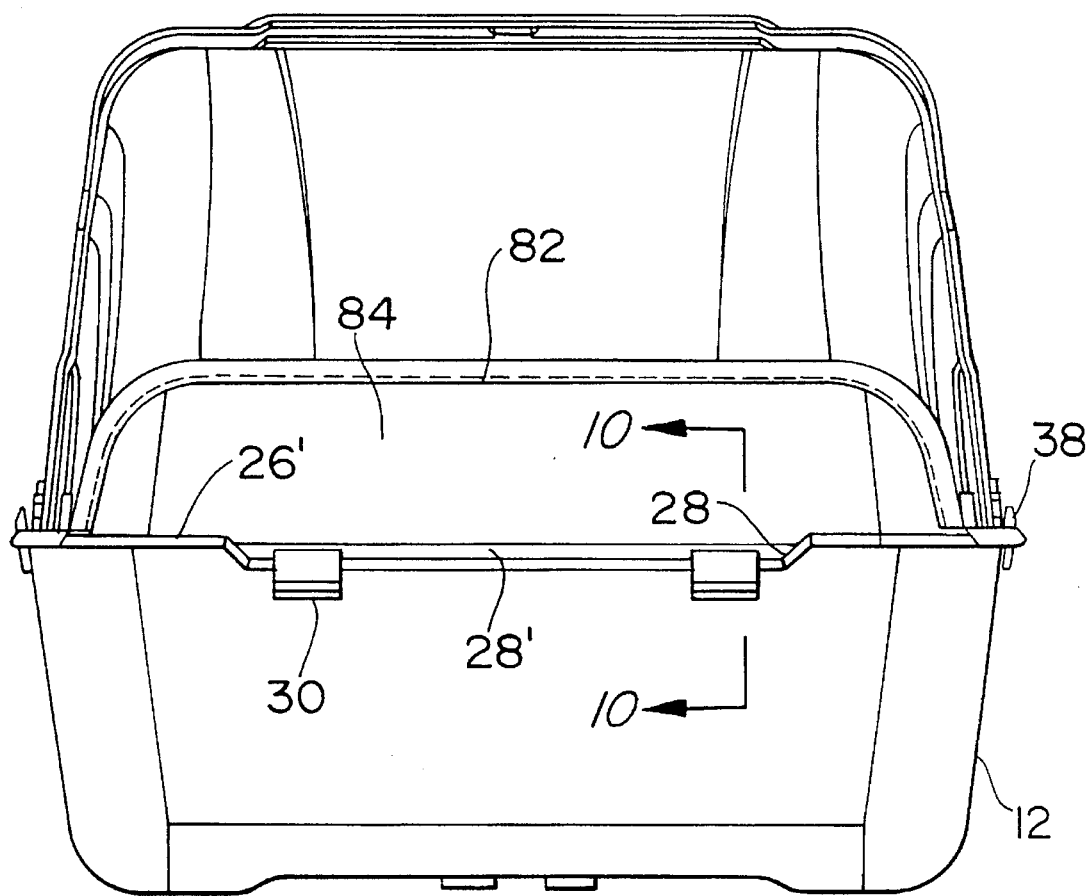
FIG. 8 is a frontal view of the litter box assembly as seen from line 8—8 in FIG. 7
Figure 10:
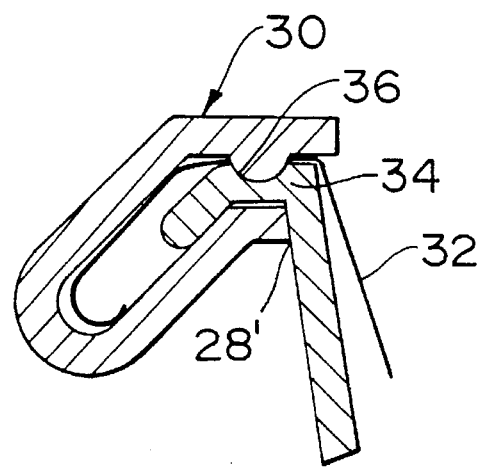
FIG. 10 is a partial sectional view taken along the line 10—10 in FIG. 8.
Figure 9:
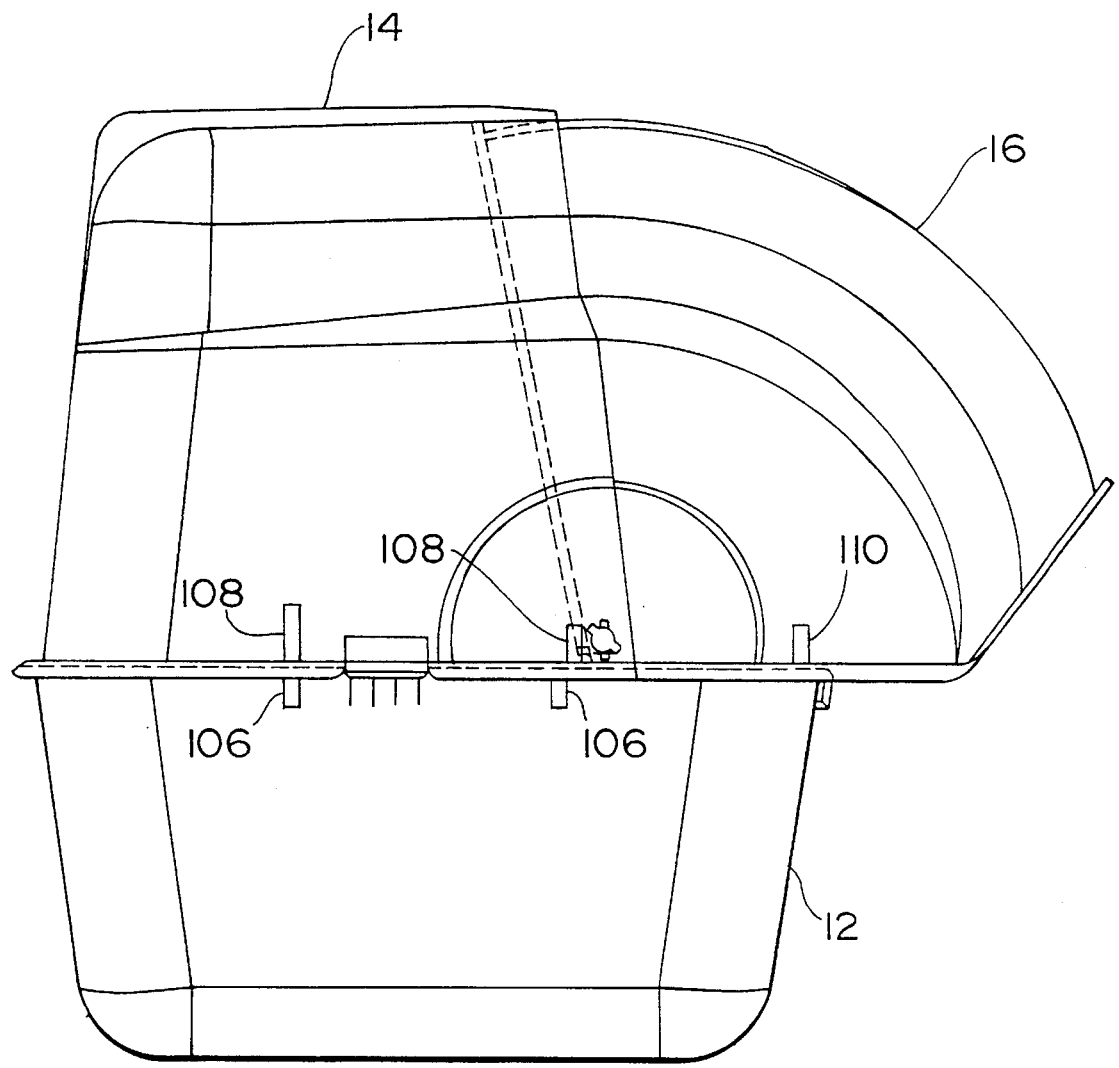
FIG. 9 is a side view of the litter box assembly of the present invention as seen along the line 9—9 in FIG. 7 and showing the mating air sealing beads on the hood and cover in dotted lines.

Tray 12 which contains the cat litter defines a front wall 22, rear wall 24 and side walls 26 which are all inclined slightly outwardly so that a plurality of boxes 12 can be compactly nested together for shipping. The walls of tray 12 also define smoothly radiused corners and outwardly flared upper edge portions 22', 24' and 26' extending about the upper perimeter of tray 12. The front wall 22 of litter tray 12 additionally defines an elongated step down portion 28 for reducing the height of the cat access opening as will be described later herein. As seen in FIGS. 1, 8 and 10, a pair of resilient snap-on locking clips 30 are provided on the upper edge 28' of the step down portion 28 of tray 12 for securing a water-proof litter liner 32 within the box (see FIGS. 10 and 15). As shown in FIG. 10, edge 28' is provided with grooves 34 which receive ribs 36 on clips 30 to secure clips 30 in place and firmly hold portions of the litter liner 32 between clips 30 and the upper forward edge of litter tray 12. This securement of the liner prevents the liner from coming loose and being pulled into the box by the cat's digging. When this occurs, cats will often playfully shred the liner, which is of course undesirable. The side walls of 26 of tray 12 each define a resilient upstanding locking tab 38 for securing the rear cover 14 in place on tray 12 as shown in FIG. 1.

Figure 3:
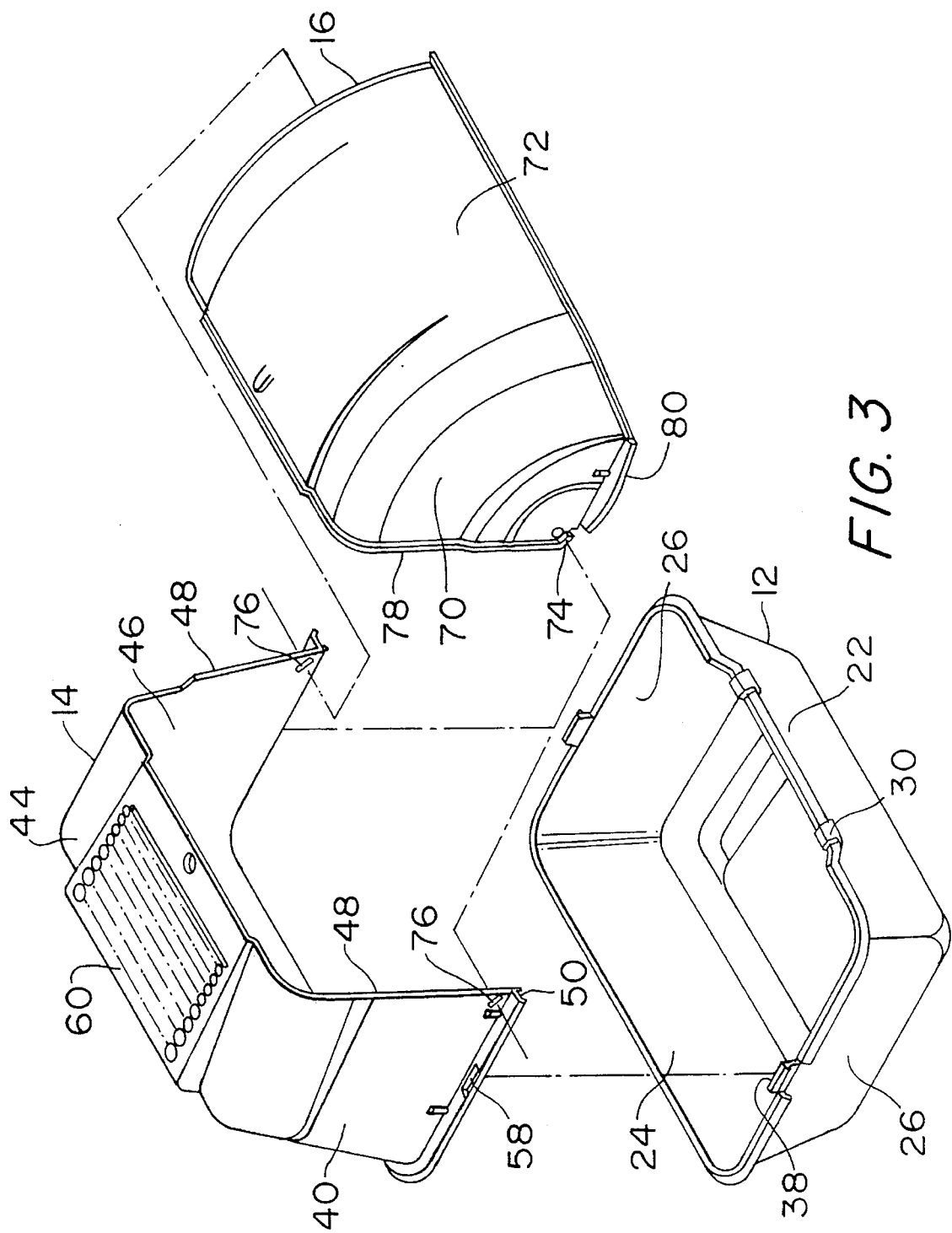
FIG. 3 is an exploded perspective view showing the components of the cat litter box assembly of the present invention.

The rear cover 14 is comprised of slightly inclined and oppositely disposed upstanding side walls 40, a slightly inclined rear wall 42, and a top wall 44 and defines an open front end 46 bordered by a forward edge 48. Integrally formed with side walls 40 and rear wall 42 at the lower ends thereof is a continuous mounting channel 50 extending about the perimeter of the lower end of the cover which is adapted to receive upper edge portions of the side and rear walls of litter tray 12 as shown in FIG. 1. As seen in FIG. 3, channel 50 is defined by a horizontal wall portion 52 which abuts the upper edge portions of litter tray 12, an interior depending flange 54 extending downwardly from side and rear walls 40 and 42 so as to form a splash guard to prevent cat urine from passing between the cover 16 and upper end of tray 12, and an exterior outwardly depending flange 56 which abuts and mates with the outer inclined portions 24" and 26" of litter tray's upper edges 24' and 26'. Elongated slots 58 are formed in the horizontal wall portions 52 of channel 50 adjacent the side walls of cover 16 to accommodate the resilient locking tabs 36 on tray 12 as seen for example in FIG. 3.

Figure 15:
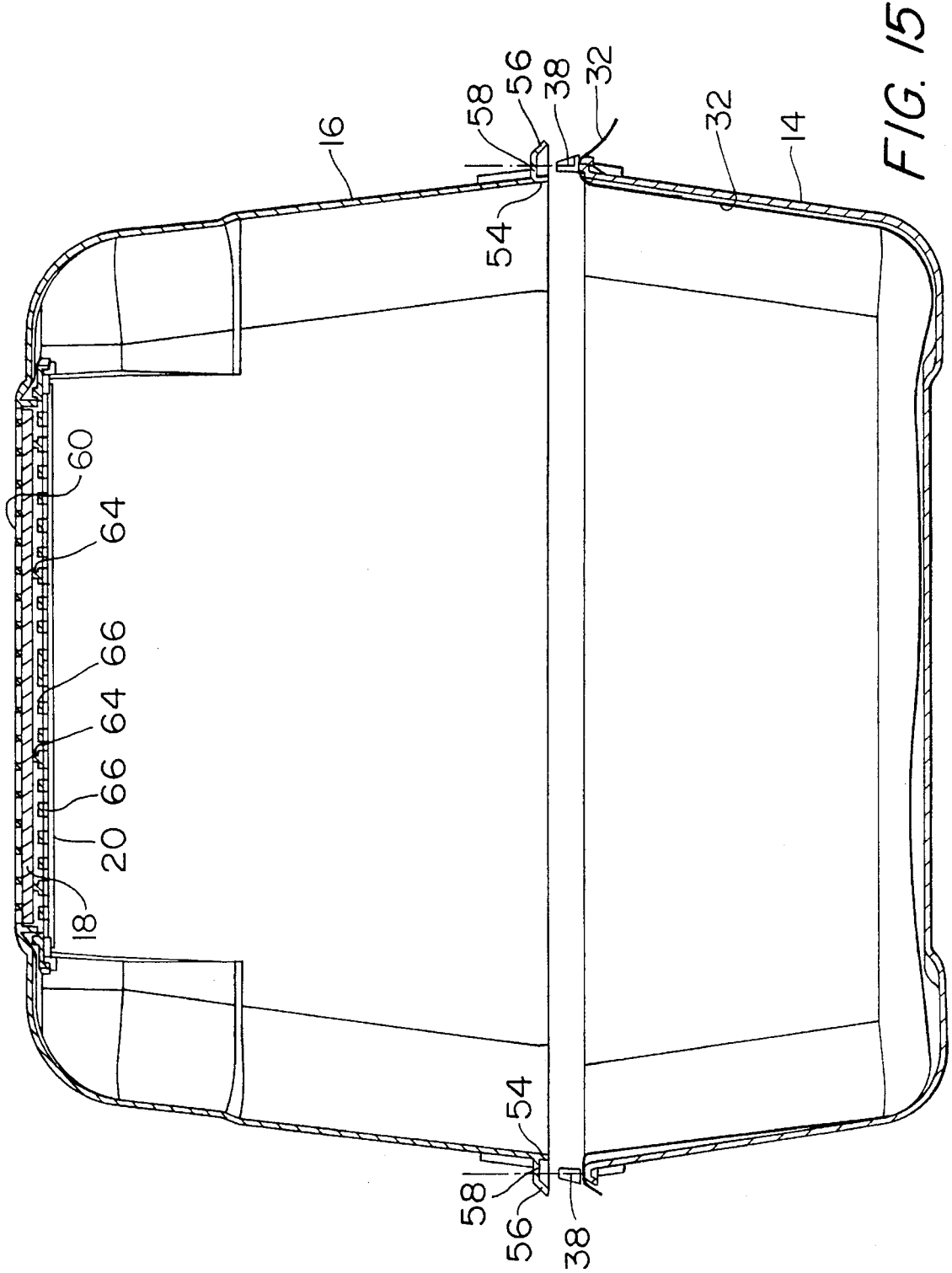
FIG. 15 is a sectional view taken along the line 15—15 in FIG. 7 and including a litter liner.

Mounted in the top wall 44 of the rear cover 14 is a filter element 18 for neutralizing the cat waste odors in the litter box assembly 10. Filter element 18 is preferably formed of 275 per cent grade, high density, activated carbon for effective odor neutralization. Filter element 18 is held between a slightly elevated and perforated portion 60 of top wall 44 of cover 14 and a supporting grate 20 affixed to the underside of cover top wall 44 and spaced slightly below perforated portion 60 to accommodate filter element 18 therebetween. Cover 14 forms an elongated transverse opening 62 at the rear upper end thereof which communicates with the area between perforated portion 60 and grate 20 such that filter element 18 can be slidably inserted and removed therethrough (see FIGS. 4, 5 and 15). To minimize any occlusion of filter element 18 by grate 20, upstanding support ribs 64 are provided at spaced intervals on grate 20 as shown in FIG. 15 to provide a slightly elevated and spaced apart support surface for the filter element 18 and thus allow air flow over the grate fingers 66 disposed between ribs 64 to maximize access of the air flow and vapors within the litter box to the filter element 18. The grate fingers 66, which do not carry a filter element, support rib 64 thereon protecting the filter element 18 from being attacked or eaten by the cat. The perforated portion 60 of cover top wall 44 is provided with a particular aperture configuration comprising oppositely oriented rows of apertures 67 of increasing diameter to minimize and equally distribute the resistance to air flow therethrough while providing the necessary support for the filter element 18.

The retractable hood 16 defines a pair of oppositely disposed side walls 70 depending from and merging into an arcuate upper wall 72. Side walls 70 are inclined slightly such that when hood 16 is retracted within cover 14, the side walls 70 will move parallel to and substantially adjacent to the side walls 40 of the rear cover 16. The curvature of upper wall 72 is defined by a segment of a constant radius circle to allow pivotal movement of the hood 16 within cover 14 without occluding the access to the litter tray 12 or litter contained therein as will be hereinafter described. Integrally formed on the side walls 70 of hood 16 are a pair of outwardly projecting pivot members 74 which extend through aligned apertures 76 in the side walls 40 of rear cover 14 adjacent the forward lower ends thereof. Pivot members 74 and aligned apertures 76 each define projecting wing portions 74' and 76' so as to provide a keyed fitment therebetween and thereby a simple and readily detachable pivotal mounting of hood 16 on cover 14.

Figure 2:
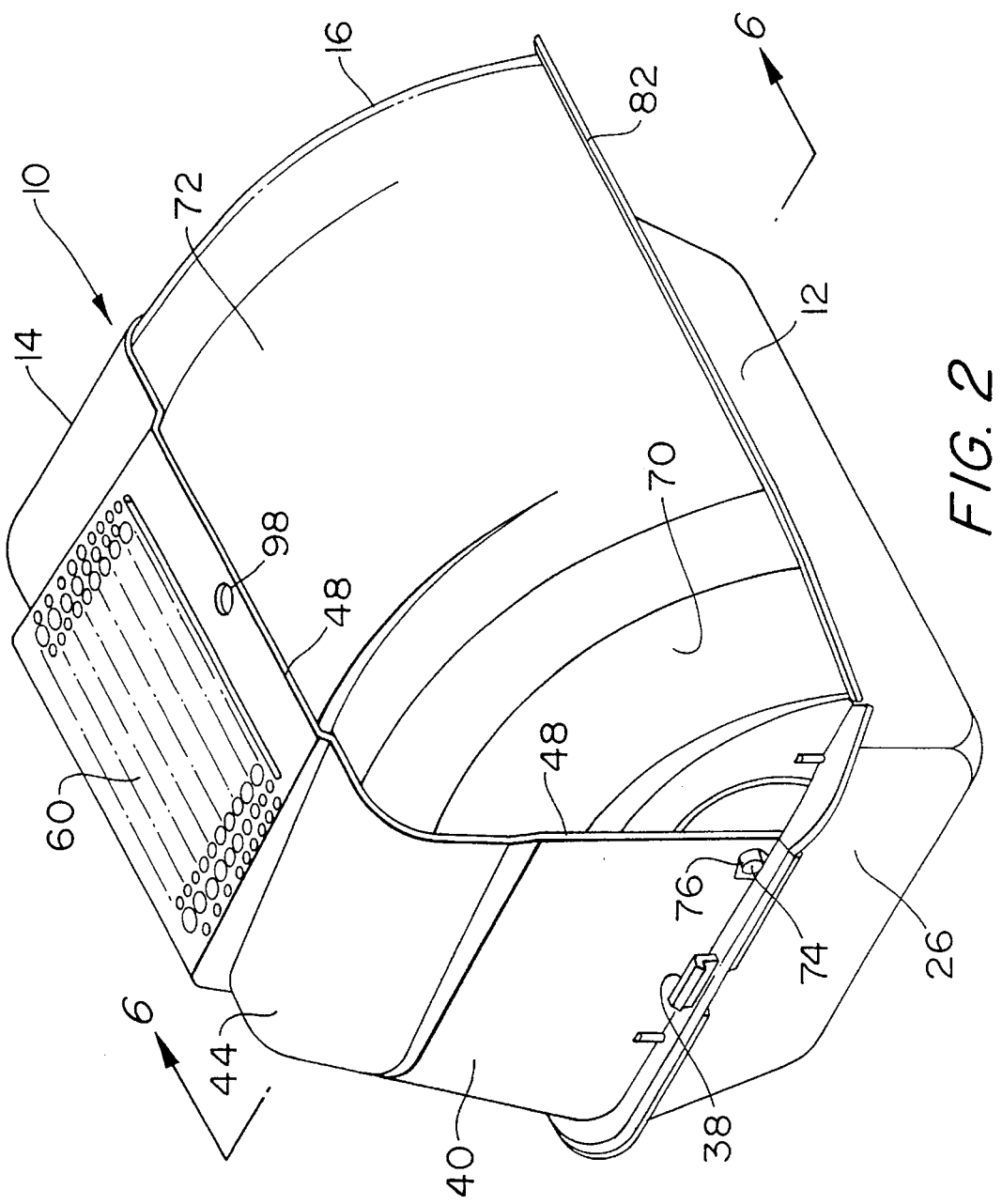
FIG. 2 is a perspective view of the cat litter box assembly of the present invention showing the hood in the extended position.

The perimeter surfaces of the retractable hood 16 defines a trailing edge 78 extending along the rearward ends of the side and upper walls 70 and 72 of the hood and a pair of forwardly disposed supporting surfaces 80 adapted to abut the upper edges 26' of the forwardly disposed ends of side walls 26 of the litter tray 12 when the hood 16 is in the extended position shown in FIG. 2. Hood 16 additionally defines at its forwardly projecting end an elongated U-shape edge portion 82 which extends between supporting surfaces 80 and is outwardly and upwardly inclined such that when the hood 16 is in the extended position as seen in FIG. 2 and 6 for example, edge portion 82 is disposed above and forwardly of the upper edge 22' of the front wall 22 of tray 12 and cooperates therewith to define an elongated cat entry area 84 which extends virtually along the entire length of the widest portion of the cat litter tray 12. The large size of the elongated entry area 84 defined by hood 16 and the forward wall 22 of litter tray 12 renders access to the litter box assembly 10 quite easy even for older and larger cats. In the preferred embodiment of the invention, the dimensions of which will be set forth in more detail later herein, the side and rear walls of litter tray 12 defines a height of about seven inches and the step down portion 28 in the front wall defines an elevation of about six inches and thereby forms both an adequate barrier to prevent litter being kicked from the box by the cat and yet is of an elevation which can be easily negotiated by most all cats, given the length and size of entry area 84. The straight line distance between the upper edge of the step down portion of litter tray 12 and the edge 82 defining area is six inches and edge 82 is disposed about ten inches above the ground. While this dimension could, of course, be increased by raising the elevation of the hood, such an entry size is adequate for most all cats and minimizes the vertical space required to locate the litter box assembly.

The retractable hood 16 is configured relative to rear cover 14 and litter box 12 such that when the hood is in the extended position, the trailing edge portion 78 is disposed proximate the forward perimeter edge 48 of cover 16 and the forward edge 82 is disposed forwardly of and above the upper forward edge 22' of litter tray 12 to provide the cat access area 84 above-described. The forward support surface 80 which projects forwardly and rearwardly from the forward edge 22' of the litter tray and abuts the forwardmost upper edge portions of the litter tray side walls 26 and thus supports the hood 16 in its extended position. In addition, depending flanges 86 are provided on the forward hood supporting surfaces 80 which, when the hood is in its extended position, are in axial alignment with and extend forwardly from the forward ends of depending cover flange 54. Like flange 54, flange 86 projects downwardly below the inner upper edge of the litter box side walls and thus forms an extension of the urine splash guard defined by flange 54. Support surface 80 also defines an outwardly extending depending flange 88 which projects over and extends forwardly of the tapered upper surface of the forward most portions of the side walls of litter box 12.

The extension of the forward edge 82 defined by hood 16 above and beyond the front wall 22 of litter box 12 in combination with the curvature of the upper wall 72 of hood 16 directs upwardly flowing air and fumes within the cat litter box assembly 10 to the filter element 18 where they are trapped and neutralized. To prevent breezes and side drafts from passing closely by the cat entry area 84 and drawing fumes from assembly 10 into the surrounding room, the hood support surfaces 80 are extended forwardly of the forward wall 22 of litter box as above-described in a horizontal disposition, as seen for example in FIG. 6, and thus extend the lower forward extensions of the side walls of the hood so as to define projecting skirt portions 90 which effectively block the sides of access area 84 and deflect any such breezes or drafts to prevent any fumes from being drawn outwardly of the litter box assembly. To prevent fumes from leaking from the assembly between the cover and retractable hood, sealing beads 92 and 94 are provided proximate the trailing edge portion 78 of the hood 16 and the forward perimeter edge 48 of cover 14. With hood 16 in the extended position, the sealing beads are in abutment and prevent fluid passage therethrough thereby providing a totally odor free cat litter box assembly.

Figure 4:
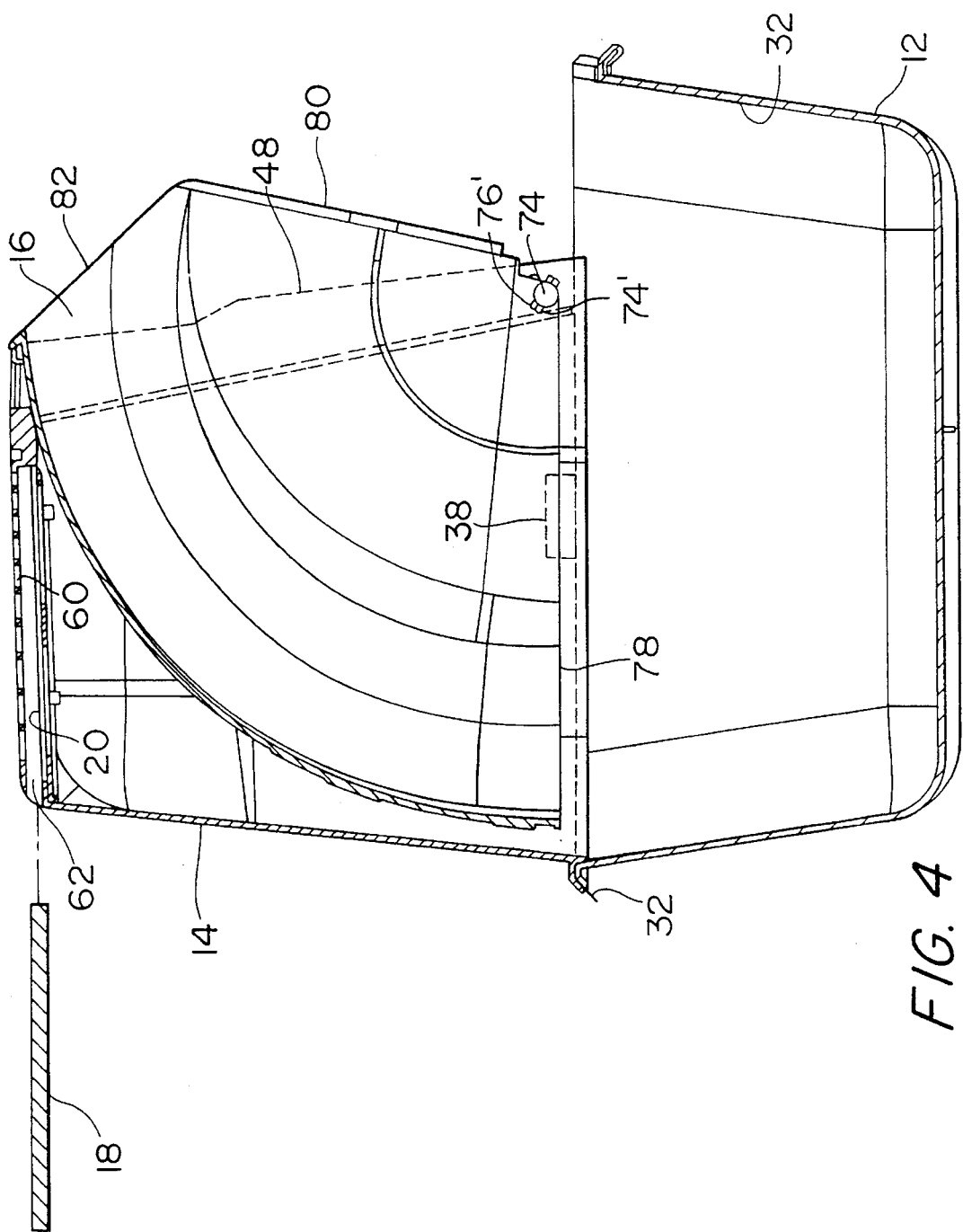
FIG. 4 is a sectional view taken along the line 4—4 in FIG. 1 with the filter element removed to show the mounting thereof and a litter liner secured in place.
Figure 5:
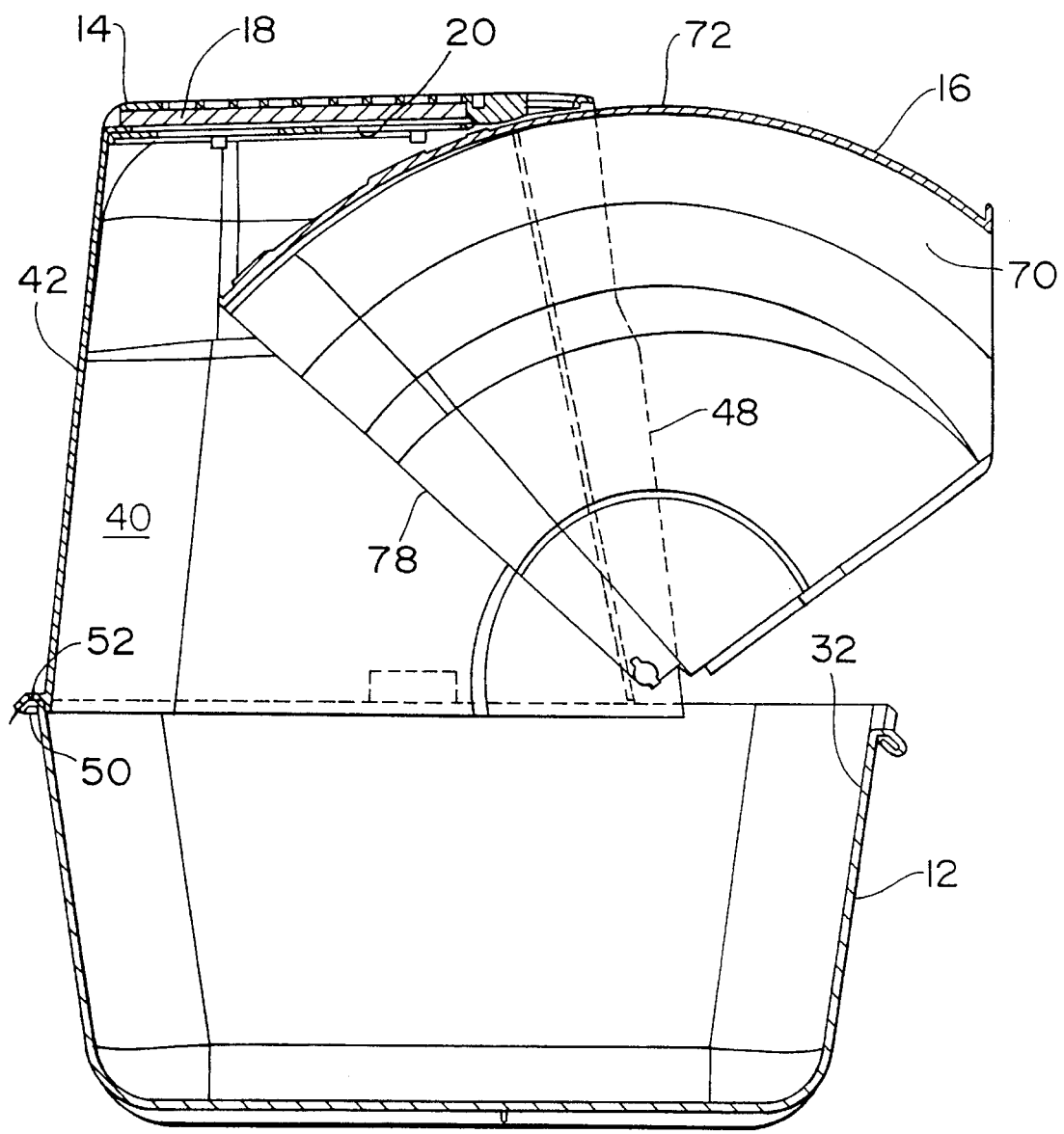
FIG. 5 is a sectional view illustrating the pivotal movement of the retractable hood within the rear cover.

In the retracted position illustrated in FIG. 1, the trailing edge 78 of the hood 16 is disposed substantially adjacent the lower perimeter edges of side walls 40 and rear walls 42 of rear cover 14 as seen in FIGS. 1 and 4 whereby any intrusion of the retractable hood into the interior of litter tray 12 in the retracted position is avoided to provide a completely unobstructed view of and access to the entire area of tray 12 and the cat litter contained therein. As seen in FIG. 4, however, the hood 16 is preferably spaced slightly away from the cover 14 so that if a cat sprays the lower end of the cover when the hood is in the extended position, the hood will not be contaminated when pushed to the retracted position.

Figure 11:
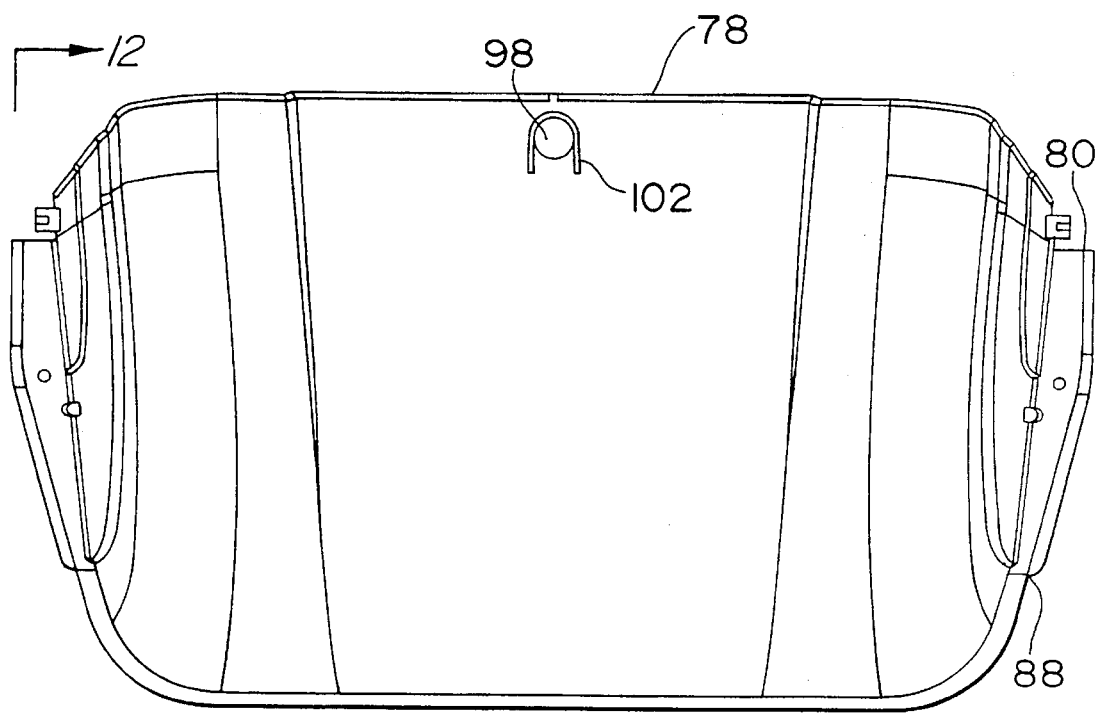
FIG. 11 is a top plan view of the retractable hood of the present invention.
Figure 12:
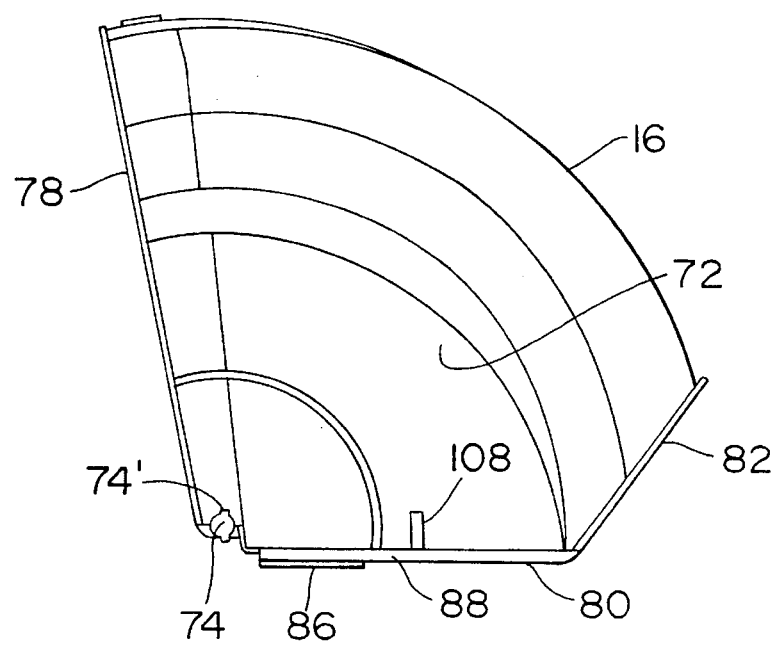
FIG. 12 is a side view of the retractable hood as seen along line 12—12 in FIG. 11.

To move the hood 16 from the retracted position shown in FIG. 1 to the extended position shown in FIG. 2, it is merely necessary to grasp the leading edge of the hood and rotate the hood forwardly to its extended position. The hood 16 is preferably provided with a raised button 96 proximate the trailing edge 78 of upper wall 72 which, in the extended position, projects through a circular opening 100 formed adjacent the perimeter edge 48 in top wall 44 of the cover. The protrusion of button 98 into opening 100 forms a push-button lock which secures the hood in its extended position and renders the assembly 10 more resistant to litter tampering by children and curious dogs. To move the hood to its retracted position, one must merely depress the button and pivot the hood rearwardly. To this purpose, a U-shape cut 102 is provided in hood 16 about button 98 as seen in FIG. 11 whereby the button can be readily depressed without having to force the entire hood downwardly to effect disengagement between the hood and cover.

When the hood 16 is in the extended position, it is important that the side walls 40 of the rear cover 14 and side walls 70 of hood 16 project upwardly from the upper edges of the litter tray 12 a distance so as to dispose the top wall 44 of cover 14 and the proximate rearward portions of upper wall 72 of hood 16 sufficiently above litter box to provide ample interior space and headroom for a cat thereunder. In an embodiment of the invention configured to provide such space and an adequate cat entry opening for most all cats while minimizing room space, the top wall 44 of the rear cover is disposed approximately 10 to 10.25 inches above the upper edge of the side wall of the litter tray 12. The radius of curvature defined by hood 16 is about 9.5 inches as measured from the center of the pivot members 74. The litter box 12 is approximately 14 inches deep and 19.3 inches across and the elevation of the side walls of tray 12 and access opening 84 are as above described. Further, the perimeter edge 48 of cover 14 is preferably angled slightly rearwardly to allow the hood to retract slightly further within the cover and thereby improve visibility and access to the interior of the tray 12 and the litter therein.

Figure 17:
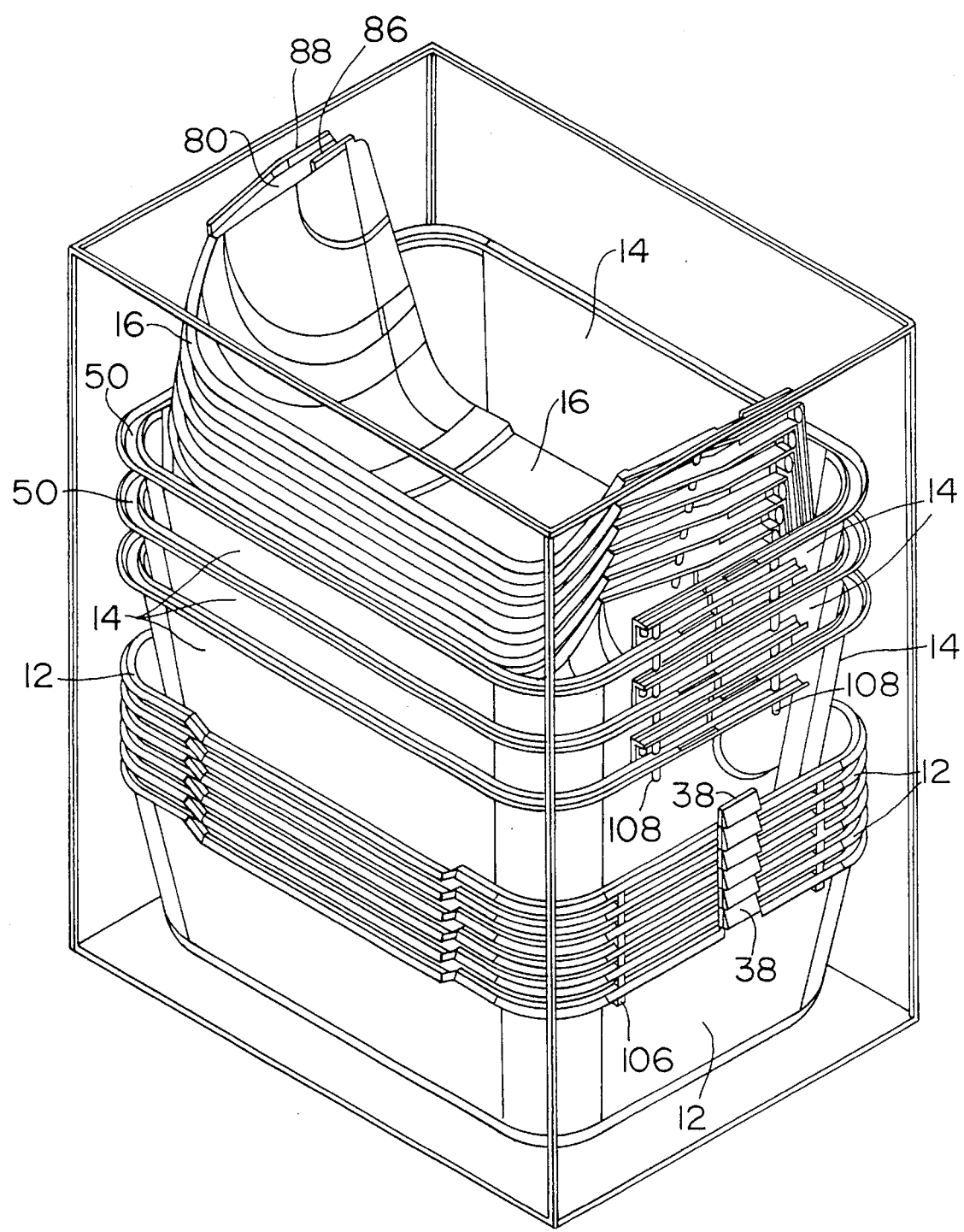
FIG. 17 is a perspective view showing a nested array of six disassembled cat litter box assemblies of the present invention disposed in a transparent shipping carton.

To prevent damage to the litter box assembly 10 during shipping and to reduce the cost of the shipping, the litter box 12, cover 14 and hood 16 are configured so as to be nested in a compact array within a shipping carton as illustrated in FIG. 17. As seen therein, six litter boxes 12 are nested together at the bottom of the array. To effect uniform stacking, each of the boxes 12 is provided with a pair of nesting spacers 106 at locations on the opposite side walls 26 thereof proximate the front and rear walls 22 and 24. Nested within the cavity of the uppermost litter box 12 in the stacked array are six of the rear covers 14. As seen therein, the rear covers are placed in alternate opposite alignment and each side of the covers is also provided with a pair of nesting spacers 108 at the lower ends of side walls 40 adjacent the upper surface of horizontal wall 52. Finally, six of the hoods 16 are nested together and placed within the open cavity formed by nested covers 14. A nesting spacer 110 is provided adjacent the lower ends of the side walls 70 of hood 16 for such purpose. By slightly tapering the side and rear walls of the cover 14 and the side walls of hood 16 as shown in the drawings, the functional objects of the assembled litter box assembly can be obtained as well as the nesting of the disassembled components described above.

Various changes and modifications may be made in carrying out the present invention without departing from the scope thereof. Insofar as these modifications are within the purview of the appended claims, they are to be considered as part of the present invention.

We claim:

1. A cat litter box assembly comprising an open walled tray adapted to contain a supply of cat litter therein, an upstanding cover removably secured to said tray and extending over a rearward portion thereof, said cover defining a top wall portion having fluid flow apertures therein, a filter element, means for mounting said filter element adjacent said fluid flow apertures, and a hood pivotally mounted with respect to said cover and said tray and being movable with respect thereto between an extended position and a retracted position, in said extended position said hood extending over and forwardly of said tray and defining therewith a cat entry area extending substantially the length of said tray and in the retracted position being substantially disposed within said cover in substantial juxtaposition therewith so as to provide unobstructed viewing and access to said tray.

2. A cat litter box assembly comprising a litter box tray having front, rear and side walls, a cover removably securable on said tray so as to project upwardly therefrom and extend over and about a portion of said tray, so secured said cover defines an open forward end disposed rearwardly of said front wall of said tray, and a hood having a forward edge portion and being movably mountable on said cover between an extended position wherein said hood projects forwardly of said cover and wherein said forward edge portion cooperates with said front wall of said tray to define a cat entry area therebetween, and a retracted position wherein said hood is disposed in substantial juxtaposition with said cover providing unobstructed access to the interior of said litter box tray.

3. The assembly of claim 2 wherein said front wall of said tray is greater in length than said side walls thereof and in said extended position said forward edge portion of said hood is spaced from and extends parallel to said front wall of said tray such that said cat entry area extends along a substantial portion of said front wall to provide an elongated cat entry area.

4. The assembly of claim 3 wherein said hood has a pair of lateral edge portions abutting said side walls of said tray in said extended position, whereupon said forward edge portion of said hood extends parallel to said front wall of said tray substantially along the entire length of said front wall and downwardly towards said front wall merging into said lateral edge portions and defining therewith a pair of forwardly and downwardly projecting draft deflectors laterally adjacent said cat entry area for preventing cross drafts from drawing odors from said litter box assembly through said cat entry area.

5. The assembly of claim 2 wherein said hood is disposed substantially within said cover in said retracted position.

6. The assembly of claim 5 wherein said hood has a rear edge portion, side walls and a curvilinear upper surface extending between said side walls and said rear edge portion and said forward edge portion, said rear edge portion of said hood being disposed within said cover proximate said open forward end of said cover in said extended position and proximate said rear wall of said tray in retracted position.

7. The assembly of claim 6 including a first elongate sealing member carried by said hood proximate said rear edge portion of said hood and a second elongate sealing member carried by said cover proximate said open forward end of said cover, said first sealing member abutting said second sealing member upon said hood being moved to the extended position to prevent air flow therebetween.

8. The assembly of claim 2 wherein said cover contains air pervious means for removably mounting an air filter element in an upper portion of said cover and an elongate sealing member disposed proximate said open forward end thereof and wherein said hood has a rear edge portion and an elongate sealing member disposed proximate said rear edge portion, said sealing member on said hood abutting said sealing member on said cover upon said hood being moved to said extended position whereby the escape of odors between said cover and said hood is prevented.

9. The assembly of claim 2 wherein said hood has a rear edge portion disposed proximate said open forward end of said cover when said hood is in said extended position, said assembly having a hood lock comprising an aperture in said cover adjacent said open forward end of said cover and a button carried by and projecting from a cantilevered tab, said cantilevered tab being carried by and integrally formed with said hood proximate said rear edge portion of said hood, said cantilevered tab urging said button within said aperture upon said hood being moved to said extended position, releasibly locking said hood in said extended position, and allowing said button to be pushed from said aperture to release said hood such that said hood can be moved to said retracted position.

10. A cat litter box assembly comprising a litter box tray having front, rear and side walls, and an enclosure mountable on said tray, said enclosure having a cover and a hood, said cover being removably securable on said tray so as to project upwardly therefrom and extend over and about a portion of said tray, so secured said cover having an open forward end disposed rearwardly of said front wall of said tray, said hood having a forward edge portion and being pivotally and removably mountable relative to said cover to pivot between and extended position, wherein said forward edge portion of said hood extends forwardly of, upwardly from and parallel to said front wall of said tray and cooperates therewith to define an elongated cat entry area and a retracted position, wherein said hood is at least substantially disposed within said cover in substantial juxtaposition therewith and provides unobstructed access to the interior of said cat litter box tray.

11. The assembly of claim 10 wherein said front wall of said tray is greater in length than said side walls, and in said extended position a substantial portion of said forward edge portion of said hood extends parallel to said front wall of said tray over a substantial portion thereof such that said cat entry area extends substantially the length of said front wall.

12. The assembly of claim 11 wherein said hood has a pair of lateral edge portions being adjacent to said upper edges of said side walls of said tray in said extended position, whereupon said forward edge portion of said hood extends parallel to and downwardly toward said front wall of said tray, merging into said lateral edge portions and defining therewith a pair of forwardly and downwardly projecting draft deflectors laterally adjacent said cat entry area for preventing cross drafts from drawing odors from said litter box assembly through said cat entry area.

13. The assembly of claim 10 wherein said forward wall of said tray has a vertically recessed portion which has a substantially horizontal lip formed on an upper end so as to define a cat step for facilitating entry to the litter tray and removing litter from the cat's paw.

14. The assembly of claim 13 wherein said front, rear and side walls of said tray define a vertical elevation of about 17.8 cm (seven inches) and said step is centrally disposed in said front wall and defines a vertical elevation of about 15.2 cm (six inches).

15. The assembly of claim 13 including a pair of liner retaining clips movably mounted on said step for securing a litter liner between said clips and said step.

16. The assembly of claim 10 wherein said hood has a rear edge portion disposed proximate said open forward end of said cover when said hood is in said extended position, said assembly having a hood lock comprising an aperture in said cover adjacent said open forward end of said cover and a button carried by and projecting from a cantilevered tab, said cantilevered tab being carried by and integrally formed with said hood proximate said rear edge portion of said hood, said cantilevered tab urging said button within said aperture upon said hood being pivoted to said extended position, releasibly locking said hood in said extended position, and allowing said button to be pushed from said aperture to release said hood such that said hood can be moved to said retracted position.

17. The assembly of claim 10 wherein said cover has a top wall having openings therein for the passage of air therethrough, a first plurality of elongated filter element securement members carried by said top wall in spaced disposition inwardly of said openings, and a second plurality of upstanding filter element support members carried by a third plurality of filter element securement members, said third plurality of filter element securement members being less in number than the first plurality of elongated filter element securement members so as to allow air flow about the first plurality of securement members which does not carry any support members such that occlusion of air flow to the underside of a filter element disposed on said support member is reduced.

18. A cat litter box assembly comprising a litter box tray having front, rear and side walls, and an enclosure mountable on said tray, said enclosure having a cover and a hood, said cover being removably securable on said tray so as to project upwardly therefrom and extend over and about a portion of said tray, so secured said cover having an open forward end disposed rearwardly of said front wall of said tray, said hood having a forward edge portion and being removably mountable relative to said cover to move between an extended position, wherein said forward edge portion of said hood extends forwardly of, upwardly from and parallel to said front wall of said tray and cooperates therewith to define an elongated cat entry area and a retracted position wherein said hood is at least substantially disposed within said cover in substantial juxtaposition therewith and provides unobstructed access to the interior of said cat litter box tray.

19. The assembly of claim 18 wherein said front wall of said tray is greater in length than said side walls and in said extended position a substantial portion of said forward edge portion of said hood extends parallel to said front wall of said tray over a substantial portion thereof such that said cat entry area extends substantially the length of said front wall.

20. The assembly of claim 18 wherein said hood has a rear edge portion disposed proximate said open forward end of said cover when said hood is in said extended position, said assembly having a hood lock comprising an aperture in said cover adjacent said open forward end of said cover and a button carried by and projecting from a cantilevered tab, said cantilevered tab being carried by and integrally formed with said hood proximate said rear edge portion of said hood, said cantilevered tab urging said button within said aperture upon said hood being moved to said extended position, releasibly locking said hood in said extended position, and allowing said button to be pushed from said aperture to release said hood such that said hood can be moved to said retracted position.

21. A cat litter box assembly comprising a generally rectangular litter box tray having front, rear and side walls wherein the length of said front and rear walls is greater than the length of said side walls, a cover being removably securable on said tray and having side, rear and top walls and an open forward end, said open forward end being disposed rearwardly of said front wall of said tray upon said cover being removably secured to said tray, and a hood having generally opposed side walls, a curvilinear top wall, a rear edge portion and a forward edge portion, said hood being pivotally and removably mountable on said cover to pivot between an extended position and a retracted position, said forward edge portion of said hood extending forwardly of, upwardly from and parallel to said front wall of said tray in said extended position and cooperating with said front wall of said tray to define an elongated cat entry area extending substantially the length of said front wall, said rear edge portion of said hood being disposed within said cover proximate said open forward end of said cover, and in said retracted position said hood is at least substantially disposed within said cover in substantial juxtaposition therewith and said forward edge portion of said hood is proximate said open forward end of said cover so as to provide unobstructed access to the interior of said litter box tray.

22. The assembly of claim 21 wherein in said retracted position, said side walls of said hood are adjacent said side walls of said cover, said curvilinear top wall of said hood extends substantially adjacent said rear and top walls of said cover, and said rear edge portion of said hood is adjacent said rear wall of said litter box tray, wherein the visual and physical access to the interior of said litter box tray is unobstructed with said hood and cover in place thereon.

23. The assembly of claim 21 wherein said top wall of said cover has a plurality of openings therein for the passage of air therethrough, said cover further having a first plurality of elongated filter element securement members carried by said top wall in spaced disposition inwardly of said plurality of openings, and a second plurality of upstanding filter element support members carried by a third plurality of filter element securement members, said third plurality of filter element securement members being less in number than the first plurality of elongated filter element securement members so as to allow air flow about the first plurality of securement members which does not carry support members such that occlusion of air flow to the underside of a filter element disposed on said support member is reduced.

24. A cat litter box comprising a walled cat litter box tray and an enclosure mountable on said tray, said enclosure having a cover and a hood, said cover having upstanding rear and side walls, a top wall and an open forward end and being removably securable on said tray such that said cover projects upwardly from and extends over and about a portion of said tray, and said hood having an elongated forward edge portion and being pivotally and removably mountable relative to said cover between an extended position, wherein said forward edge portion of said hood is disposed above and forwardly of said tray and cooperates with said tray to define a cat entry area and a retracted position, wherein said forward edge portion of said hood is disposed proximate said open forward end of said cover and said hood is in substantial juxtaposition with said cover so as to provide unobstructed access to the interior of said litter box tray.

25. The assembly of claim 24 wherein said hood has a rear edge portion, said rear edge portion being disposed within said cover in both said extended and retracted positions.

26. The assembly of claim 24 wherein said hood is disposed substantially within said cover in said retracted position, said litter box tray has an elongated front wall, and said forward edge portion of said hood is elongated and in said extended position and extends substantially parallel to said front wall of said tray such that said cat entry area is elongated to facilitate cat access therethrough.

27. The assembly of claim 26 wherein said hood has a rear edge portion, said rear edge portion being disposed within said cover in both said extended and retracted positions.

28. The assembly of claim 26 wherein said hood has a curvilinear top wall for directing upwardly flowing air to said top wall of said cover, said top wall of said cover having a plurality openings therein for the passage of air therethrough, said cover further having a first plurality of filter element securement members carried by said top wall of said cover in spaced disposition inwardly of said plurality of openings, a second plurality of upstanding filter element support members carried by a third plurality of filter element securement members, said third plurality of filter element securement members being less in number than said first plurality of filter element securement members so as to allow air flow about the first plurality of filter securement members which does not carry support members such that occlusion of air flow to the underside of a filter element disposed on said support members is reduced.

29. The assembly of claim 24 wherein said hood has a pair of lateral edge portions, said edge portions being adjacent to upper edges of side walls of said walled cat litter box tray in said extended position, whereupon said forward edge portion of said hood extends parallel to and downwardly toward a front wall of said walled cat litter box tray, merging into said lateral edge portions and defining therewith a pair of forwardly and downwardly projecting draft deflectors laterally adjacent said cat entry area for preventing cross drafts from drawing odors from said litter box assembly through said cat entry area.

30. The assembly of claim 29 wherein said hood is at least substantially disposed within said cover when said cover is in said retracted position.

31. The assembly of claim 29 wherein the front wall of said walled cat litter box tray is elongated, and said forward edge portion of said hood is elongated and in said extended position, extends substantially parallel to said front wall of said walled cat litter box tray such that said cat entry area is elongated and extends substantially the length of said front wall to facilitate cat access therethrough.

32. The assembly of claim 29 wherein said hood is disposed substantially within said cover in said retracted position, said front wall of said litter box tray is elongated and said forward edge portion of said hood is elongated, and in said retracted position, extends substantially parallel to said front wall of said walled cat litter box tray such that said cat entry area is elongated and extends substantially the length of said front wall to facilitate cat access therethrough.

33. The assembly of claim 24 wherein said walled cat litter box tray has outwardly inclined front, rear and side walls so that a plurality of said trays can be stacked together in an overlapping disposition for shipping, said side walls of said cover being inwardly inclined at a first angle of inclination so that a corresponding plurality of said covers can be stacked together in an inverted, alternating opposed and overlapping disposition within a plurality of stacked trays for shipping therewith and wherein said hood has inwardly inclined side walls at a second angle of inclination and a curvilinear top wall extending therebetween, the second angle of inclination of said side walls of said hood being substantially equal to the first angle of inclination of the side walls of said cover such that as said hood is moved between said extended and retracted positions, said side walls thereof move substantially adjacent to said walls on said cover to minimize intrusion of said hood into said tray while additionally allowing a plurality of said hoods to be stacked together within said plurality of opposed and overlapping covers for shipping with said covers and trays in a balanced and compact configuration.

34. A cat litter box assembly comprising a substantially rectangular litter box tray having front, rear and side walls, said front and rear walls being longer than said side walls, and enclosure mountable on said tray and including a cover and a hood, said cover having upstanding rear and side walls and being removably securable on said rear and side walls of said tray so as to project upwardly therefrom and extend over and about a portion of said tray, so secured said cover having an open forward end disposed rearwardly of said front wall of said tray, and said hood having upstanding side walls, a curvilinear top wall, a forward edge portion and rearward edge portion and being pivotally and removably mountable relative to said cover to pivot between an extended position and a retracted position, in said extended position said rearward edge portion of said hood being disposed within said cover proximate said open forward end thereof and said forward edge portion being disposed above and forwardly of said front wall of said tray and extending along said front wall to define an elongated cat entry area extending substantially the length of said front wall of said tray, and in said retracted position said hood being disposed at least substantially within said cover in substantial juxtaposition therewith, said rearward edge portion of said hood being disposed proximate said rear wall of said tray and said forward edge portion being disposed proximate said open forward end of said cover so as to provide unobstructed access to the interior of said litter box tray.

35. The assembly of claim 34 including a first pair of pivot mounts carried by said upstanding side walls of said hood and a second pair of pivot mounts carried by said side wall of said cover, said first pair of pivot mounts cooperating with said second pair of pivot mounts to form a removable pivot mounting of said hood on and with respect to said cover.

36. A cat litter box assembly comprising a litter box tray having front, rear and side walls, each wall having an upper edge portion, and an enclosure mountable on said litter box tray and including a cover and a hood, said cover being removably securable on said upper edge portions of said rear and side walls of said litter box tray so as to project upwardly therefrom and extend over and about a portion of said litter box tray, so secured said cover having an open forward end disposed rearwardly of said front wall of said litter box tray, said hood having a forward edge portion and being pivotally and removably mountable relative to said cover to pivot between an extended position wherein said forward edge portion is disposed forwardly of and above said upper edge portion of said front wall of said litter box tray and with said upper edge portion of said front wall defines an elongated cat entry area extending substantially the length of said front wall of said tray, and a retracted position wherein said hood is at least substantially disposed within said cover in substantial juxtaposition therewith and provides unobstructed access to the interior of said litter box tray.

37. The assembly of claim 36 including resilient locking tabs carried by said upper edge portions of said side walls of said litter box tray, said resilient locking tabs releasibly engaging portions of said cover for removably securing said enclosure on said litter box tray.

38. The assembly of claim 36 wherein said upper edge portion of said front wall of said litter box tray has a centrally disposed and vertically offset cat step therein for further facilitating a cat access to the litter box tray and removing litter from the cat's paws.

39. The assembly of claim 36 wherein said hood has a pair of lateral edge portions, said lateral edge portions being adjacent said upper edge portions of said side walls of said litter box tray in said extended position whereupon said forward edge portion of said hood extends parallel to and downwardly toward said front wall of said litter box tray, merging into said lateral edge portions and defining therewith a pair of forwardly and downwardly projecting draft deflectors laterally adjacent said cat entry area for preventing cross drafts from drawing odors from said litter box assembly through said cat entry area.

* * * * *